US009723782B2

United States Patent
Roth et al.

(10) Patent No.: US 9,723,782 B2
(45) Date of Patent: Aug. 8, 2017

(54) QUICK-CHANGE BLADE COVER ASSEMBLY

(71) Applicant: HUSQVARNA AB, Huskvarna (SE)

(72) Inventors: Chris Roth, Harrisburg, NC (US); Eric Tse, Charlotte, NC (US); Darren Chandler, Orangeburg, SC (US)

(73) Assignee: HUSQVARNA AB, Huskvarna (SE)

( * ) Notice: Subject to any disclaimer, the term of this patent is extended or adjusted under 35 U.S.C. 154(b) by 7 days.

(21) Appl. No.: 14/908,238

(22) PCT Filed: Jul. 31, 2013

(86) PCT No.: PCT/US2013/052973
§ 371 (c)(1),
(2) Date: Jan. 28, 2016

(87) PCT Pub. No.: WO2015/016895
PCT Pub. Date: Feb. 5, 2015

(65) Prior Publication Data
US 2016/0157424 A1 Jun. 9, 2016

(51) Int. Cl.
*A01D 34/00* (2006.01)
*A01D 34/81* (2006.01)
*A01D 34/73* (2006.01)
*A01D 34/82* (2006.01)

(52) U.S. Cl.
CPC ........... *A01D 34/81* (2013.01); *A01D 34/733* (2013.01); *A01D 34/82* (2013.01)

(58) Field of Classification Search
CPC .... A01D 34/733; A01D 34/736; A01D 34/62; A01D 34/63; A01D 34/73; A01D 34/664; A01D 34/81; A01D 34/82; A01D 2101/00; Y10S 56/17; Y10S 56/20; Y10S 464/901
USPC ....... 56/1, 12.7, 17.5, 249, 255, 295; 30/276
See application file for complete search history.

(56) References Cited

U.S. PATENT DOCUMENTS

| | | | | |
|---|---|---|---|---|
| 3,910,017 A | * | 10/1975 | Thorud | A01D 34/63 56/295 |
| 5,622,035 A | * | 4/1997 | Kondo | A01D 34/733 30/276 |
| 6,237,970 B1 | | 5/2001 | Joannou | |
| 6,367,235 B1 | * | 4/2002 | Moynihan | A01D 34/733 464/901 |
| 7,775,026 B2 | * | 8/2010 | Bever | A01D 34/733 56/255 |

(Continued)

FOREIGN PATENT DOCUMENTS

WO 2013048574 A1 4/2013

OTHER PUBLICATIONS

International Search Report and Written Opinion in International patent application No. PCT/US2013/052973 dated Feb. 5, 2014.

(Continued)

*Primary Examiner* — Robert Pezzuto
(74) *Attorney, Agent, or Firm* — McNair Law Firm, P.A.

(57) ABSTRACT

A lawn care device may include a cutting deck housing at least one blade, a rotatable shaft, and a blade mount operably coupled to the rotatable shaft. The blade mount may include a clasp to secure the at least one blade within an engagement slot of the blade mount. The cover assembly may form a cavity with at least one sidewall extending substantially around a periphery of the blade mount.

20 Claims, 13 Drawing Sheets

(56) References Cited

U.S. PATENT DOCUMENTS 9,113,595 B2 * 8/2015 Roth .................. A01D 34/733
2004/0042874 A1 3/2004 Benedetti et al.

OTHER PUBLICATIONS

International Preliminary Report on Patentability in International patent application No. PCT/US2013/052973 dated Feb. 2, 2016.

* cited by examiner

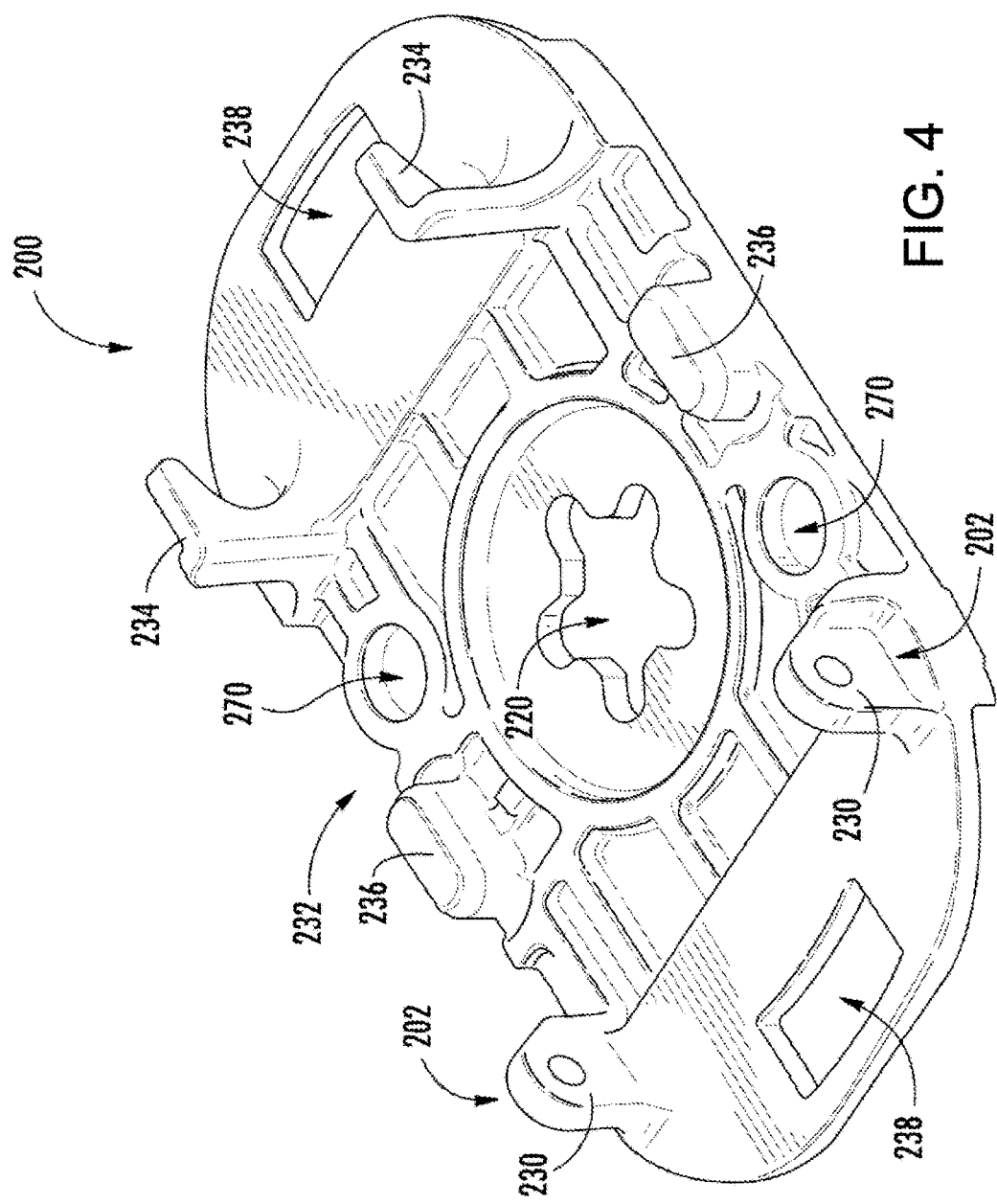

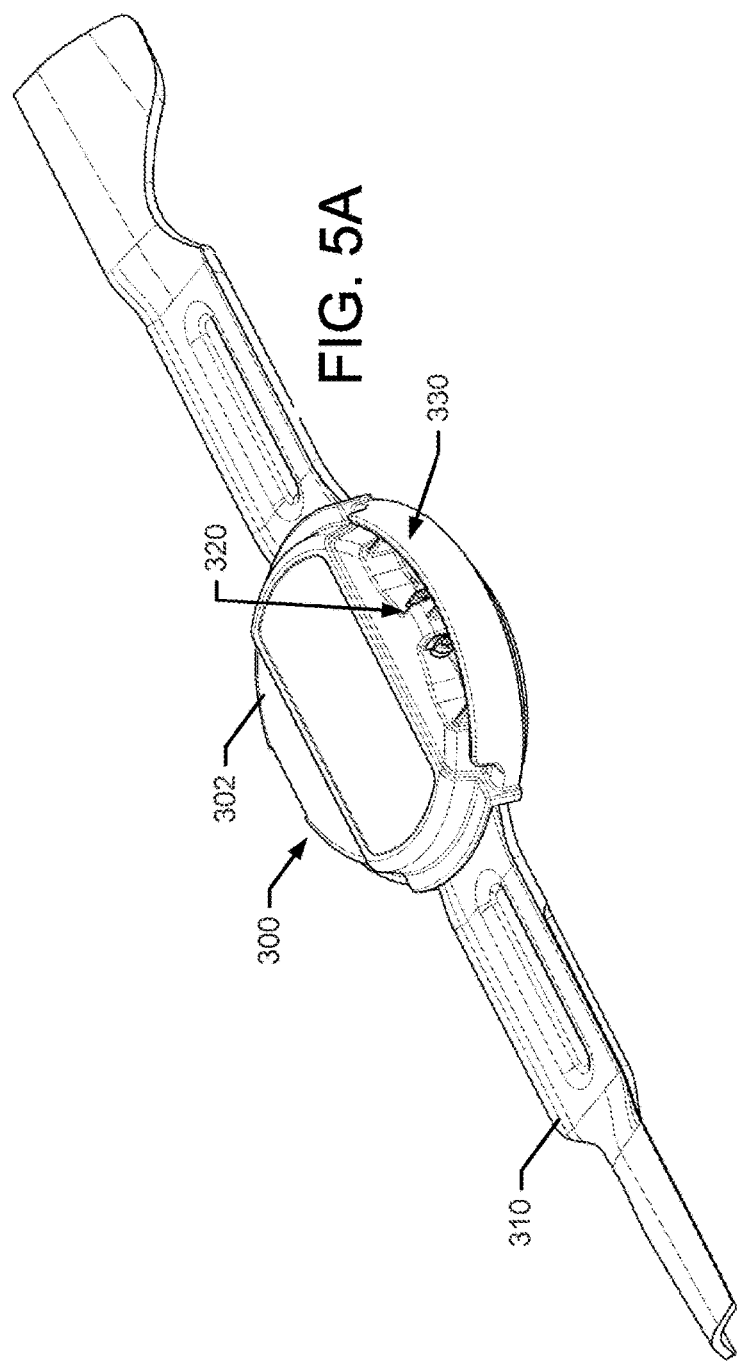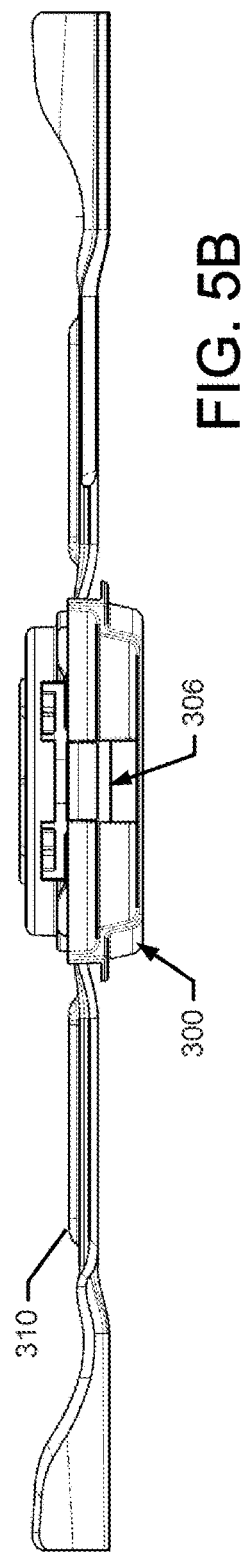

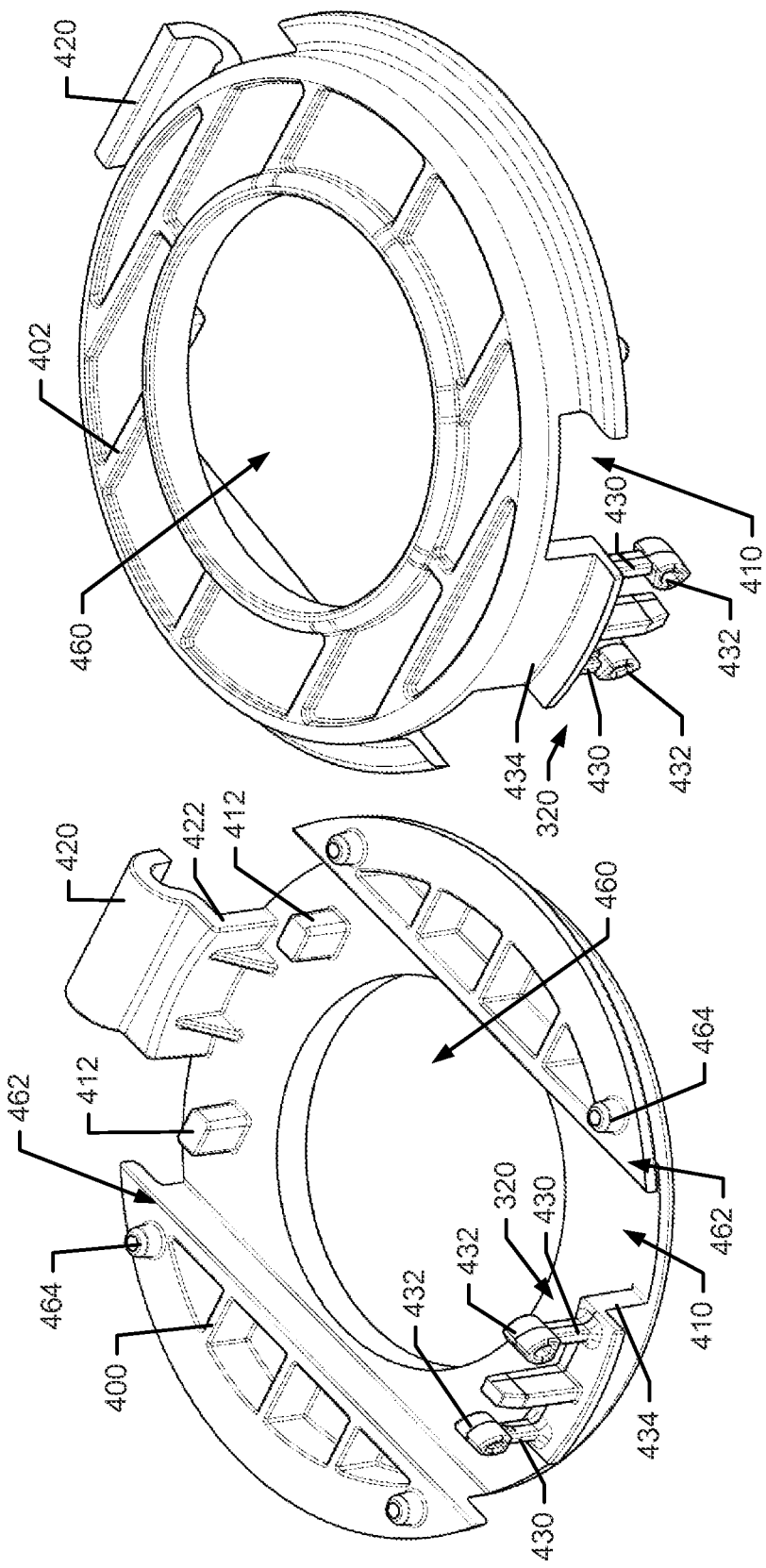

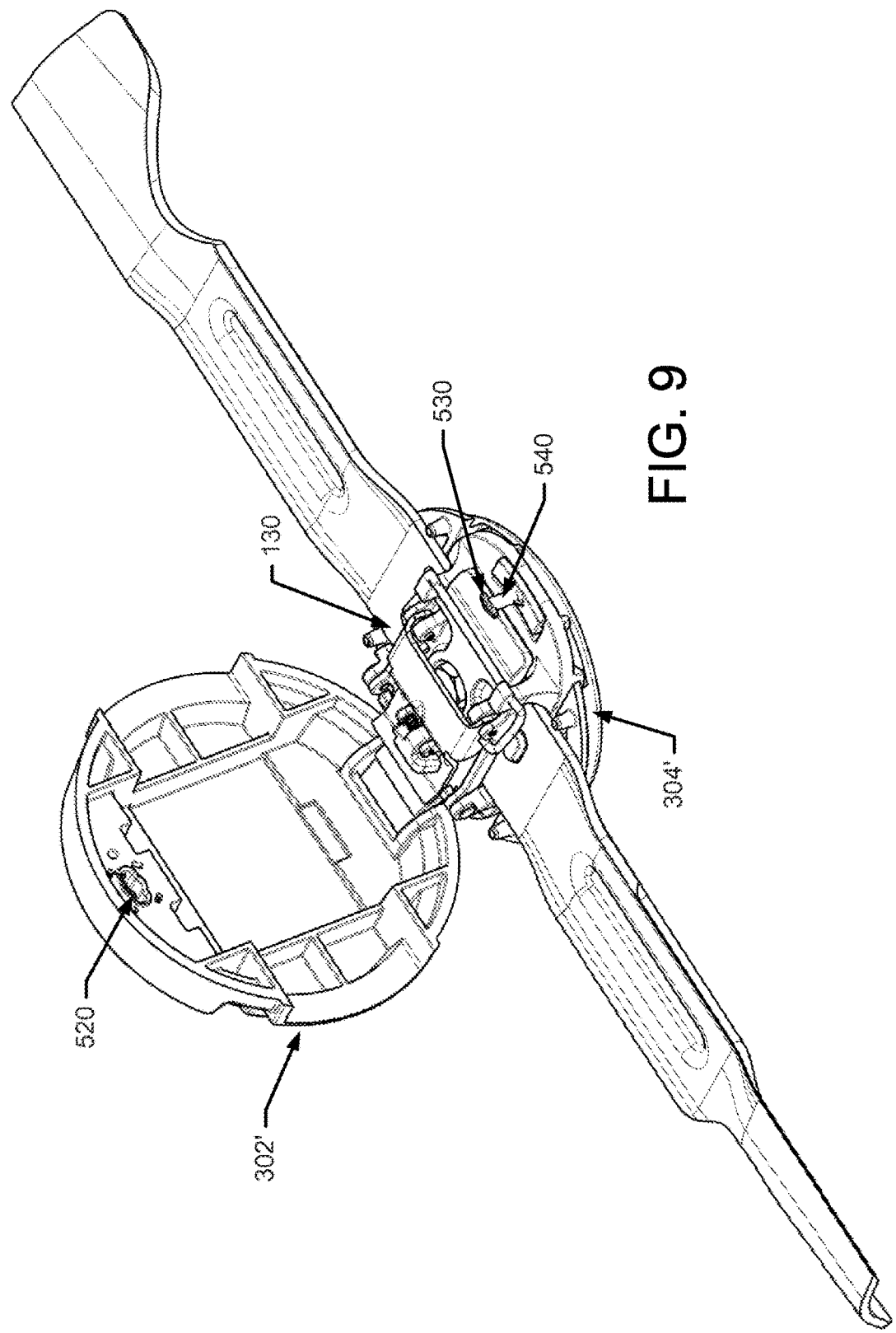

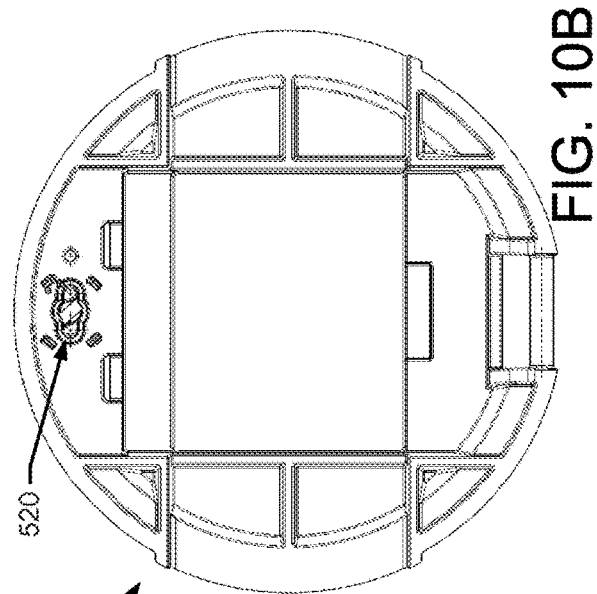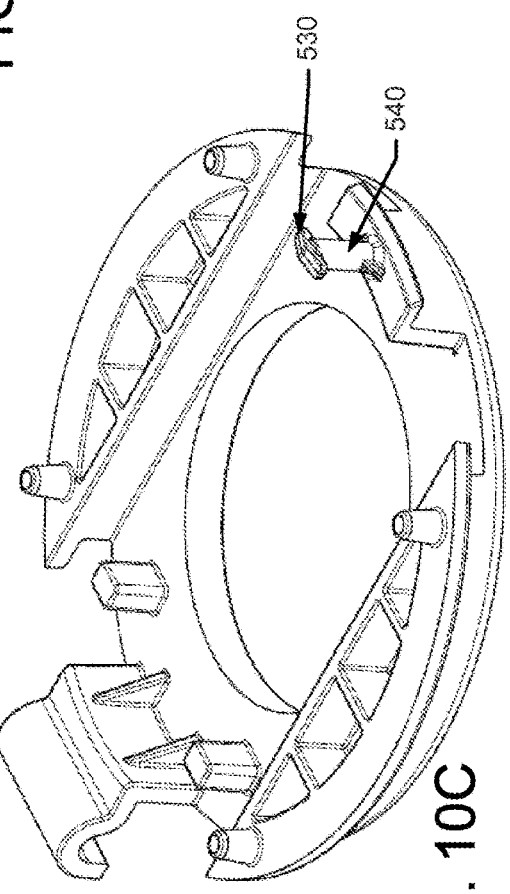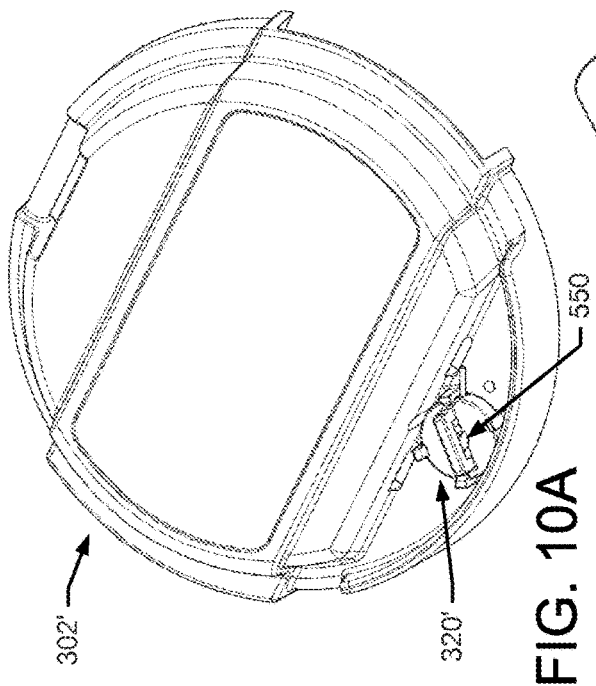

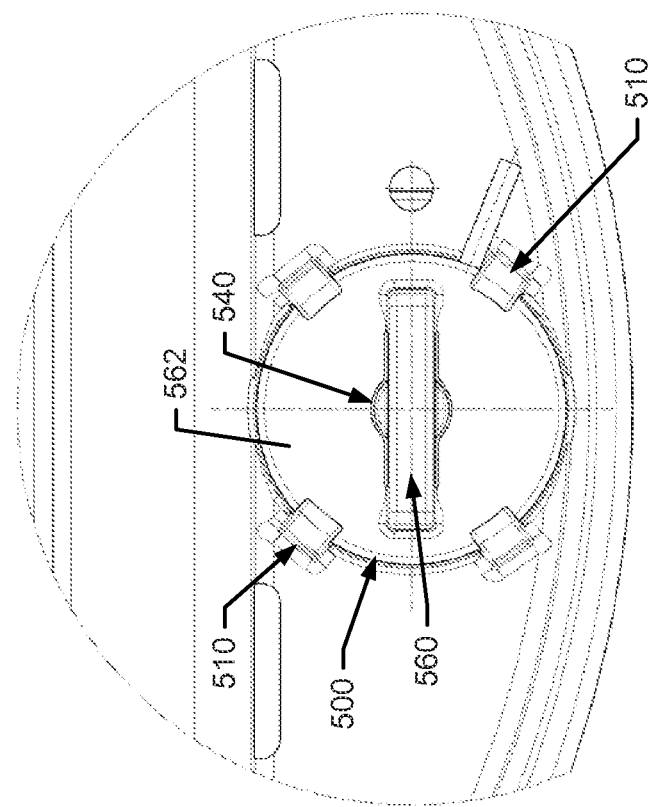
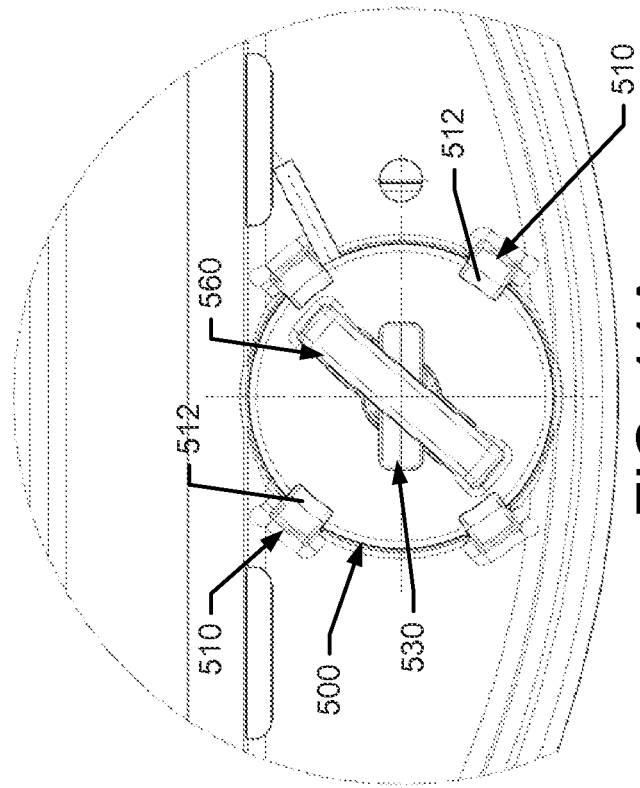

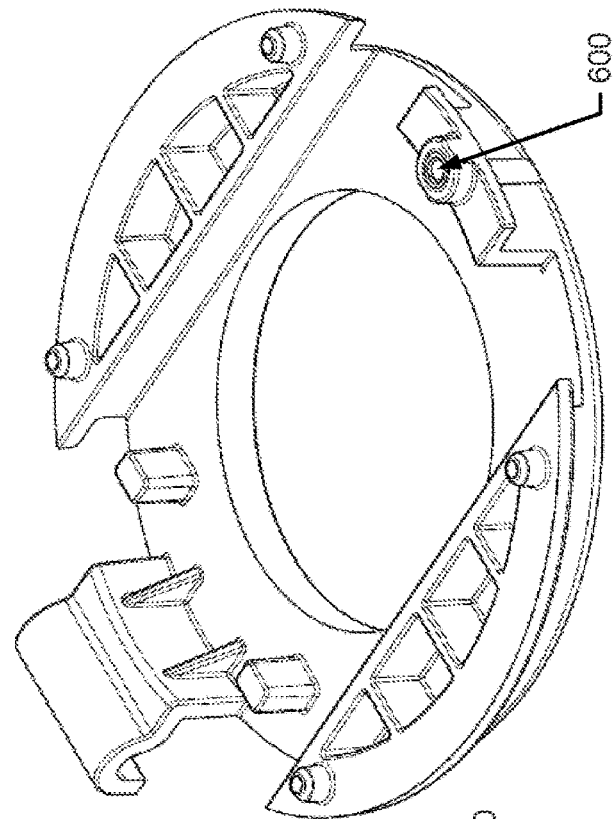
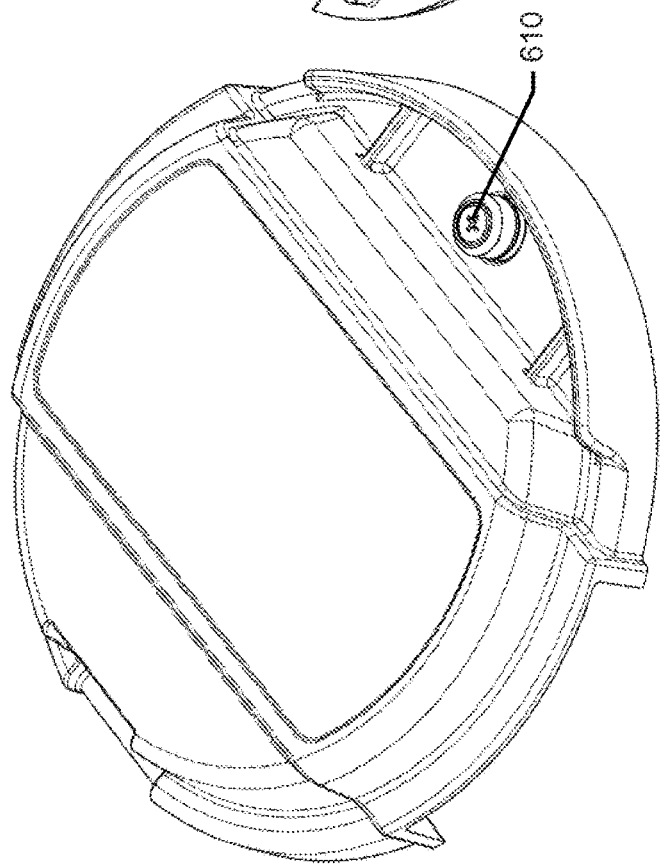
FIG. 12B
FIG. 12A

QUICK-CHANGE BLADE COVER ASSEMBLY

TECHNICAL FIELD

Example embodiments generally relate to outdoor power equipment and, more particularly, some embodiments relate to a lawn mower with a blade assembly that has blades that can be quickly removed and/or replaced.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers and/or the like) in addition to grass cutting components. Riding lawn mowers provide the convenience of a riding vehicle as well as a typically larger cutting deck as compared to a walk-behind model.

The cutting blades of a lawn mower are an important, but sometimes overlooked, component of the lawn mower. The sharpness of the lawn mower blade impacts the quality of cut achieved using the corresponding blade. In this regard, for example, if a blade is not sharp, blades of grass may receive an uneven cut and the ends of the grass may tend to brown, leaving a less desirable appearance to the lawn and increasing susceptibility to some diseases. Meanwhile, using a sharp blade can achieve a cleaner cut that leaves a more appealing appearance to the cut lawn.

Blade sharpening or replacement requires removal of the blade from the lawn mower. Some lawn mower operators may be intimidated by the prospect of removing the blades either due to their perception of the complexity or difficulty of the task or due to their perception of the likelihood that tools that they do not possess may be required to complete the task. In some cases, different styles of blades may be employed for cutting, mulching, or other lawn care tasks. An unwillingness or lack of desire to make blade changes can also cause lawn mower operators to fail to achieve the full potential of their lawn mowers. To address these issues, a quick-change blade system may make it easier for operators to change out blades. However, given that such a system operates in a hostile environment, it may be desirable to protect the system in an appropriate and useful way.

BRIEF SUMMARY OF SOME EXAMPLES

Some example embodiments may provide a cover assembly for a quick-change blade system that may allow users to make blade changes on a lawn mower relatively quickly and easily, while still offering protection to the blade holding assembly itself. In this regard, for example, some embodiments may provide for a cover assembly that is robust and capable of providing a protective housing for the blade mount portion of the quick-change blade system. Such a cover assembly may prevent debris from interfering with operation of the blade mount or from damaging the blade mount. However, the cover assembly may, at the same time, be easy to operate without tools and perhaps even with only one hand. Some example embodiments may therefore improve the ability of operators to change blades quickly and easily. Operators may therefore take fuller advantage of the capabilities of their lawn mowers, and have a greater satisfaction with the performance of their lawn mowers.

In an example embodiment, a lawn care device is provided. The lawn care device may include a cutting deck housing at least one blade, a rotatable shaft, and a blade mount operably coupled to the rotatable shaft. The blade mount may include a clasp to secure the at least one blade within an engagement slot of the blade mount. The cover assembly may form a cavity with at least one sidewall extending substantially around a periphery of the blade mount.

In another example embodiment, a cover assembly is provided. The cover assembly may house a blade mount configured to couple a blade to a rotatable shaft. The blade mount may include a clasp to secure the at least one blade within an engagement slot of the blade mount. The cover assembly may form a cavity with at least one sidewall extending substantially around a periphery of the blade mount.

It will be appreciated that, although some embodiments of the invention are illustrated herein as providing a quick-change system for blades on a lawn mower (e.g., a riding lawn mower, a walk-behind lawn mower, or the like), the quick-change mounting apparatuses described herein may be used to similarly couple other devices together, and thus the cover assembly may also be used on such other devices as well. For example, the mounting apparatuses described herein may be used to couple cutting elements to other types of lawn care equipment, such as trimmers, edgers, circular saws, chainsaws, and/or the like. The mounting apparatuses may also be used to couple rotary elements in devices other than lawn care equipment. For example, the mounting apparatuses described herein may be used to attach fan blades to a fan where a cover is desirable for covering the mounting apparatuses.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 4 illustrates a detailed perspective view of one example embodiment of the blade mount base;

FIG. 5A illustrates a perspective view of a cover assembly for a blade mount holding a blade while the cover assembly is in a closed position according to an example embodiment;

FIG. 5B illustrates a side view of the cover assembly in the closed position according to an example embodiment;

FIG. 8A illustrates a perspective view of the interior of the cover base according to an example embodiment;

FIG. 8B illustrates a perspective view of the exterior of the cover base according to an example embodiment;

FIG. 9 illustrates a perspective view of a cover assembly having an alternative cover latch assembly in an open position according to an example embodiment;

FIG. 10A illustrates a perspective view of the exterior of a cover top of the cover assembly of FIG. 9 according to an example embodiment;

FIG. 10B illustrates a top view of the interior of the cover top of FIG. 9 according to an example embodiment;

FIG. 10C illustrates a perspective view of the interior of the cover base of FIG. 9 according to an example embodiment;

FIG. 11A illustrates a view of the cover latch assembly of FIG. 9 in the locked position according to an example embodiment;

FIG. 11B illustrates a view of the cover latch assembly of FIG. 9 in the unlocked position according to an example embodiment;

FIG. 12A illustrates a top view of the exterior of a cover top having an alternative cover latch assembly according to another example embodiment; and FIG. 12B illustrates a perspective view of the interior of a cover base having the alternative cover latch assembly according to another example embodiment.

DETAILED DESCRIPTION

Figure 1A:
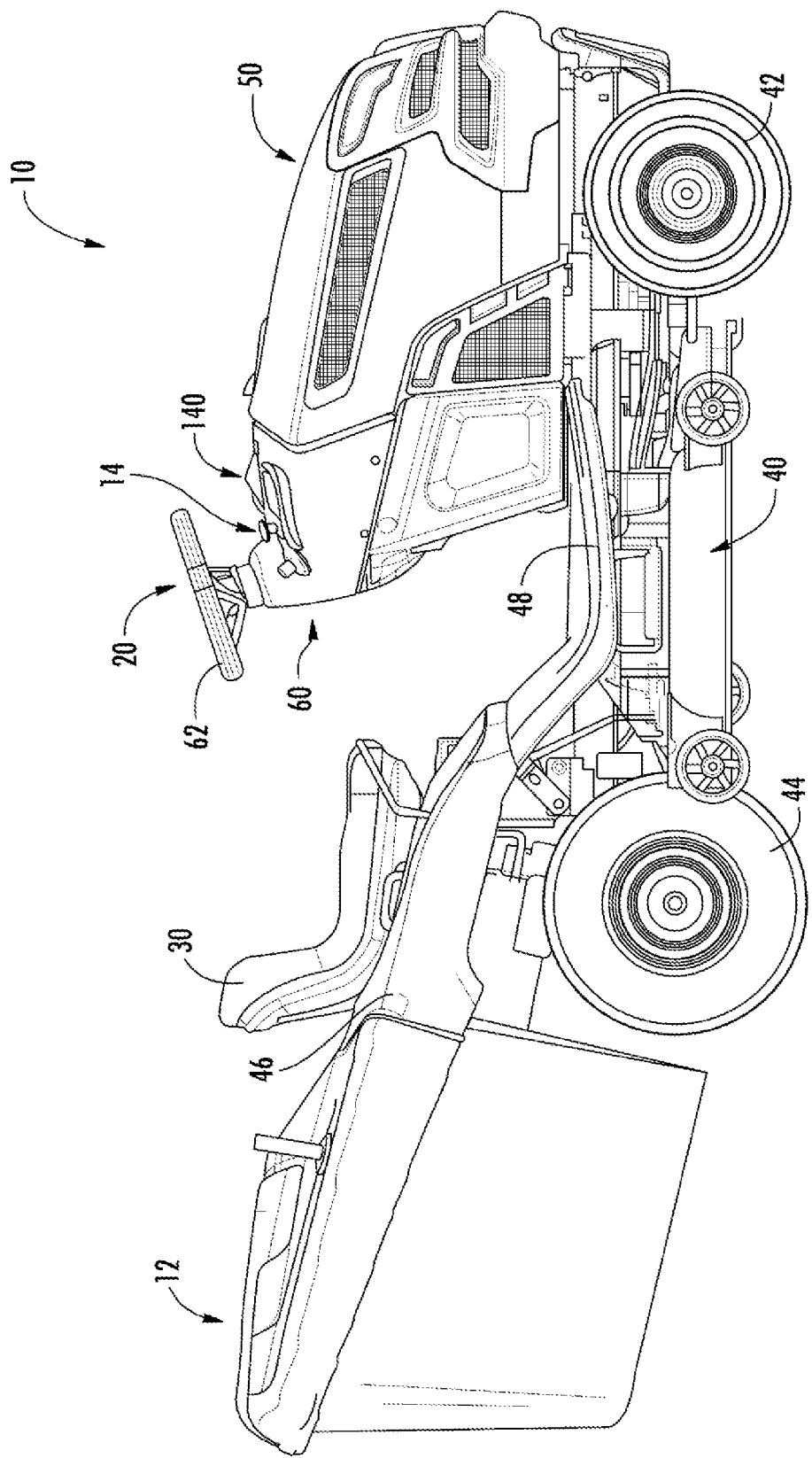
FIG. 1A illustrates a side view of a riding lawn care vehicle according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "lawn care" is meant to relate to any yard maintenance activity and need not specifically apply to activities directly tied to grass, turf or sod care. As used herein, operable coupling should be understood to relate to direct or indirect connection that, in either case, enables functional interconnection of components that are operably coupled to each other.

In an example embodiment, a lawn mower is provided with a quick-change blade system. The quick-change blade system may include a mounting apparatus configured to provide operators with an ability to relatively easily remove and/or replace lawn mower blades using the mounting apparatus. In some embodiments, the removal and/or replacement may be performed without any tools and, in some cases, with the use of only one hand. Furthermore, some embodiments may even make it possible for an operator to easily disconnect or connect a blade without requiring jacking up of the lawn mower or removal of the deck since some embodiments may be easy and safe enough to use to allow an operator to reach under a deck and operate the mounting apparatus in a small amount of space or without a direct line of sight.

Some embodiments of the mounting apparatus may be sold as part of the lawn mower either permanently or removably attached to the spindle. However, in other instances, embodiments of the mounting apparatus may be sold separately from the lawn mower and configured to allow older model lawn mowers to be retrofitted with a mounting apparatus of an example embodiment. Example embodiments may further provide a cover assembly to shield the mounting apparatus. In particular, since the mounting apparatus is expected to be rotated at a relatively high speed within an environment in which debris of varying sizes may be encountered, it may be desirable to shield the mounting apparatus from impacts with the debris using the cover assembly. Alternatively or additionally, the cover assembly may facilitate ensuring that even if debris is able to enter into the vicinity of the mounting apparatus, such debris may not be able to negatively impact the functionality of the mounting apparatus.

Figure 1B:
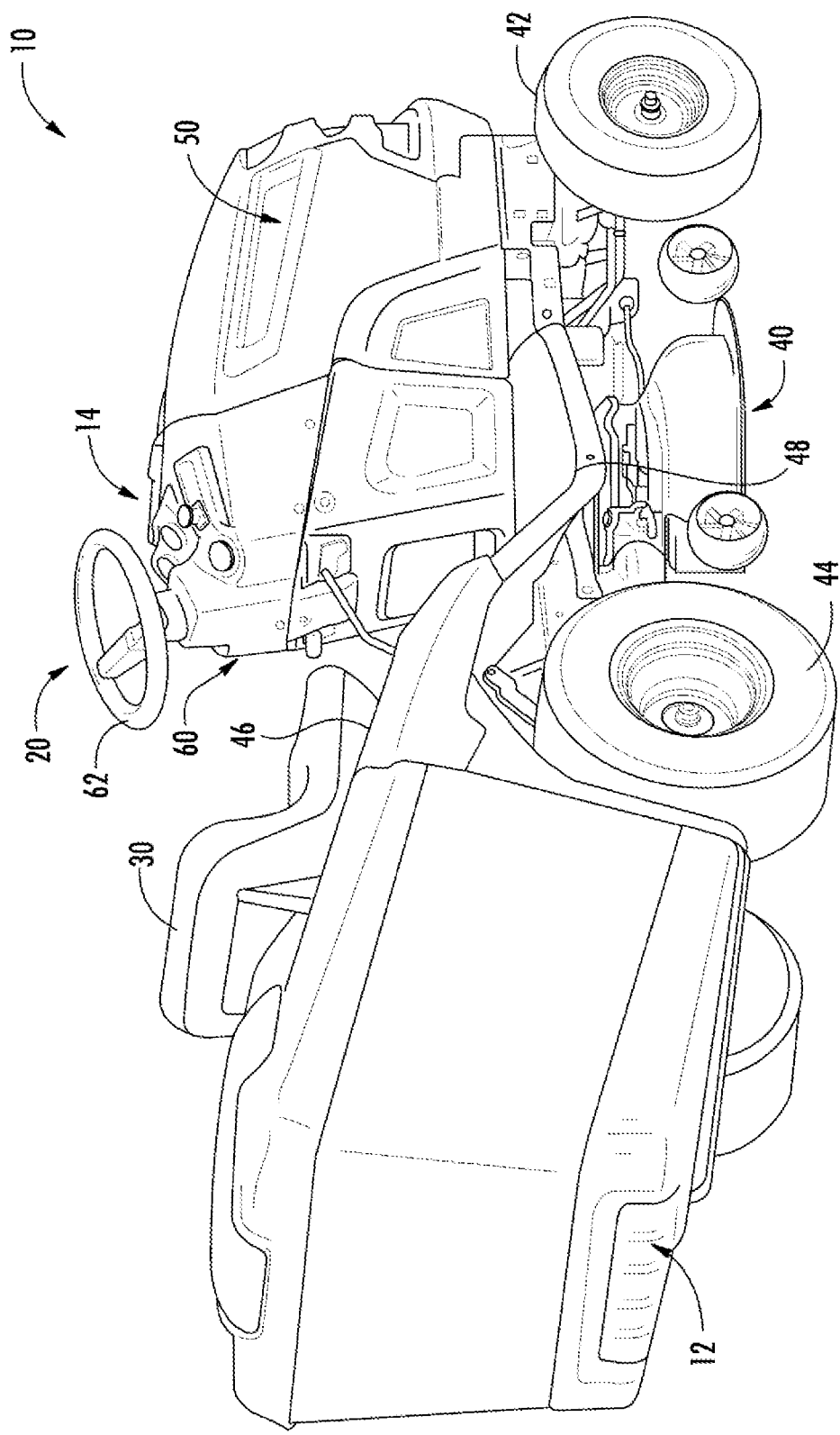
FIG. 1B illustrates a perspective view of the riding lawn care vehicle according to an example embodiment.

FIG. 1, which includes FIGS. 1A and 1B, illustrates an example of a riding lawn care vehicle 10 having a bagging attachment 12. However, it should be appreciated that example embodiments may be employed on numerous other riding lawn care vehicles that may not include a bagging attachment 12. The riding lawn care vehicle 10 may also include an information panel 14 displaying operational information regarding the riding lawn care vehicle 10. As shown and described herein, the riding lawn care vehicle 10 may be a riding lawn mower (e.g., a lawn tractor, front-mount riding lawn mower, zero-turn riding lawn mower, cross mower, stand-on riding lawn mower, and/or the like). However, other example embodiments may be employed on other lawn mowers, such as robotic mowers, walk behind lawn mowers, remote-controlled lawn mowers, and/or the like.

FIG. 1A illustrates a side view of the riding lawn care vehicle 10 and FIG. 1B illustrates a perspective view of the riding lawn care vehicle 10. The riding lawn care vehicle may include a steering assembly 20 (e.g., including a steering wheel, handle bars, or other steering apparatus) functionally connected to wheels of the riding lawn care vehicle 10 to which steering inputs are provided (e.g., the front and/or rear wheels in various different embodiments) to allow the operator to steer the riding lawn care vehicle 10. In some embodiments, the riding lawn care vehicle 10 may include a seat 30 that may be disposed at a center, rear or front portion of the riding lawn care vehicle 10. The operator may sit on the seat 30, which may be disposed to the rear of the steering assembly 20 to provide input for steering of the riding lawn care vehicle 10 via the steering assembly 20.

The riding lawn care vehicle 10 may also include, or be configured to support attachment of, a cutting deck 40 having at least one cutting blade mounted therein. In some cases, a height of the at least one cutting blade may be adjustable by an operator of the riding lawn care vehicle 10. The cutting deck 40 may be a fixed or removable attachment in various different embodiments. Moreover, a location of the cutting deck 40 may vary in various alternative embodiments. For example, in some cases the cutting deck 40 may be positioned in front of the front wheels 42, behind the rear wheels 44, or in between the front and rear wheels 42 and 44 (as shown in FIG. 1) to enable the operator to cut grass using the at least one cutting blade when the at least one cutting blade is rotated below the cutting deck 40. In some embodiments, the cutting deck 40 may be lifted or rotated relative to the lawn mower frame to permit easier access to the underside of the lawn mower without requiring removal of the cutting deck 40. The cutting deck 40 may have one, two, three, or more cutting blades driven by one, two, three, or more rotatable shafts. The shafts may be rotated by any number of mechanisms. For example, in some embodiments the shafts are coupled to a motor via a system of belts and pulleys. In other embodiments the shafts may be coupled to the motor via a system of universal joints, gears, and/or other shafts. In still other embodiments, such as in an electric lawn mower, the shaft may extend directly from an electric motor positioned over the cutting deck.

In some embodiments, the front wheels 42 and/or the rear wheels 44 may have a shielding device positioned proximate thereto in order to prevent material picked up in the wheels from being ejected toward the operator. Fender 46 is an example of such a shielding device. When operating to cut grass, the grass clippings may be captured by a collection system (e.g., bagging attachment 12), mulched, or expelled from the cutting deck 40 via either a side discharge or a rear discharge.

The riding lawn care vehicle 10 may also include additional control related components such as one or more speed controllers, cutting height adjusters and/or the like. Some of the controllers, such as the speed controllers, may be provided in the form of foot pedals that may sit proximate to a footrest 48 (which may include a portion on both sides of the riding lawn care vehicle 10) to enable the operator to rest his or her feet thereon while seated in the seat 20.

In the pictured example embodiment of FIG. 1, an engine 50 of the riding lawn care vehicle 10 is disposed substantially forward of a seated operator. However, in other example embodiments, the engine 50 could be in different positions such as below or behind the operator. In some embodiments, the engine 50 may be operably coupled to one or more of the wheels of the riding lawn care vehicle 10 in order to provide drive power for the riding lawn care vehicle 10. In some embodiments, the engine 50 may be capable of powering two wheels, while in others, the engine 50 may power all four wheels of the riding lawn care vehicle 10. Moreover, in some cases, the engine 50 may manually or automatically shift between powering either two wheels or all four wheels of the riding lawn care vehicle 10. The engine 50 may be housed within a cover that forms an engine compartment to protect engine 50 components and improve the aesthetic appeal of the riding lawn care vehicle 10.

In an example embodiment, the engine compartment may be positioned proximate to and/or mate with portions of a steering assembly housing 60. The steering assembly housing 60 may house components of the steering assembly 20 to protect such components and improve the aesthetic appeal of the riding lawn care vehicle 10. In some embodiments, a steering wheel 62 of the steering assembly 20 may extend from the steering assembly housing 60 and a steering column (not shown) may extend from the steering wheel 62 down through the steering assembly housing 60 to components that translate inputs at the steering wheel 62 to the wheels to which steering inputs are provided.

In some embodiments, the engine 50 may also provide power to turn the cutting blade or blades disposed within the cutting deck 40. In this regard, for example, the engine 50 may be used to turn a shaft upon which the cutting blade or blades may be fixed (e.g., via a belt and pulley system and/or other mechanisms). The turning of the shaft, at high speeds, may move the cutting blade or blades through a range of motion that creates air movement that tends to straighten grass for cutting by the moving blade and then eject the cut grass out of the cutting deck 40 (e.g., to the bagging attachment 12 or to the back or side of the riding lawn care vehicle 10), unless the blade and mower are configured for mulching.

Figure 2:
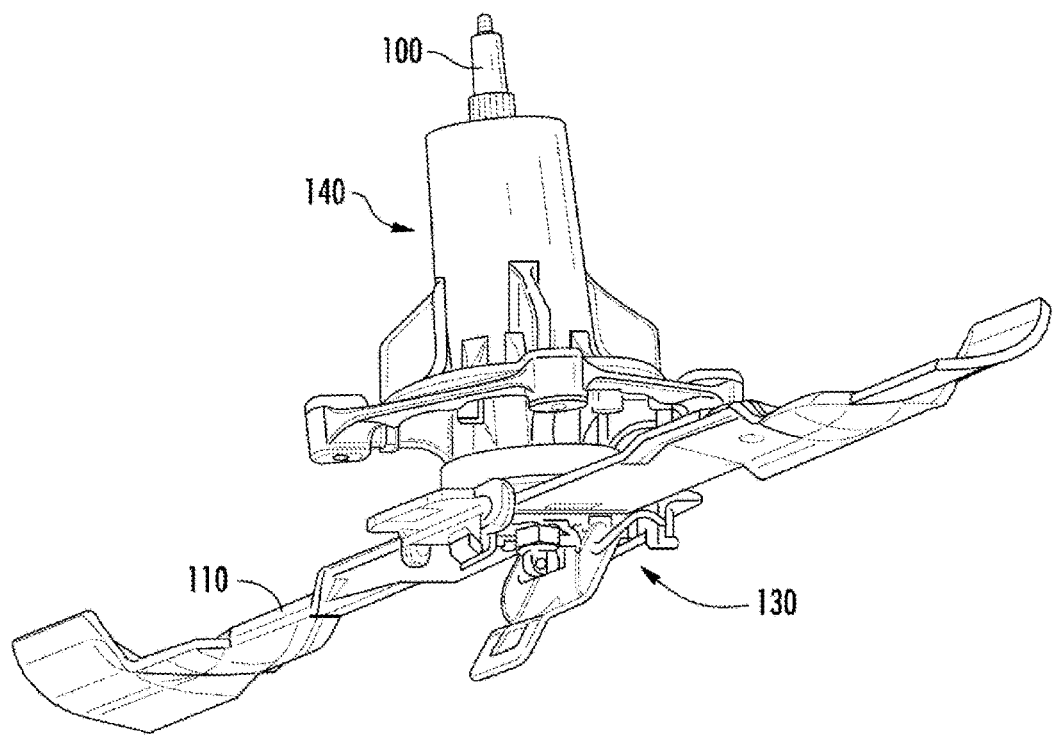
FIG. 2 illustrates a perspective view of components associated with the blade mount employing a covering according to an example embodiment.

FIG. 2 illustrates an isolated perspective view of an underside of the cutting deck 40 according to an example embodiment. As can be seen in FIG. 2, shaft 100 (often also referred to as a spindle) may extend downward into a center region of the cutting deck 40. A blade 110 may be attached to the shaft 100. Conventionally, the blade 110 may be directly attached to the shaft 100 via an attachment device such as, for example, bolt. In this regard, for example, the bolt may pass through an opening in a center of the blade 110 and thereafter be screwed into a distal end of the shaft 100 (e.g., with or without a washer between the bolt and the blade 110). Thus, blade removal would require the bolt 120 to be removed. This, of course would require the use of tools, and may require tipping, removal or elevation of the cutting deck 40.

Some example embodiments may provide for the inclusion of a mounting apparatus (e.g., blade mount 130), which may enable the blade 110 to be removed without tools and, in some cases, without requiring tipping, removal or elevation of the cutting deck 40. The blade mount 130 may be operably coupled to the shaft 100. For example, the blade mount 130 may be directly affixed to the shaft 100 via the bolt. In this regard, for example, the bolt may pass through an opening in a center portion of the blade mount 130 (e.g., with or without a washer between the bolt and the blade 110) and may be tightened to affix the blade mount 130 to the shaft 100.

The blade mount 130 may then grasp and hold the blade 110, without the bolt actually engaging the blade 110. Advantageously, the bolt may be tightened (e.g., using tools capable of supplying sufficient torque) to the blade mount 130 and the blade 110 may be removed or replaced thereafter simply by operating the blade mount 130 while the blade mount 130 remains tightened in attachment to the shaft 100 via the bolt. Thus, there may be no physical connection between the bolt or the shaft 100 and the blade 110. Instead, the blade 110 may be operably coupled to the shaft 100 via the blade mount 130 in a secure and yet easily releasable fashion.

Figure 3:
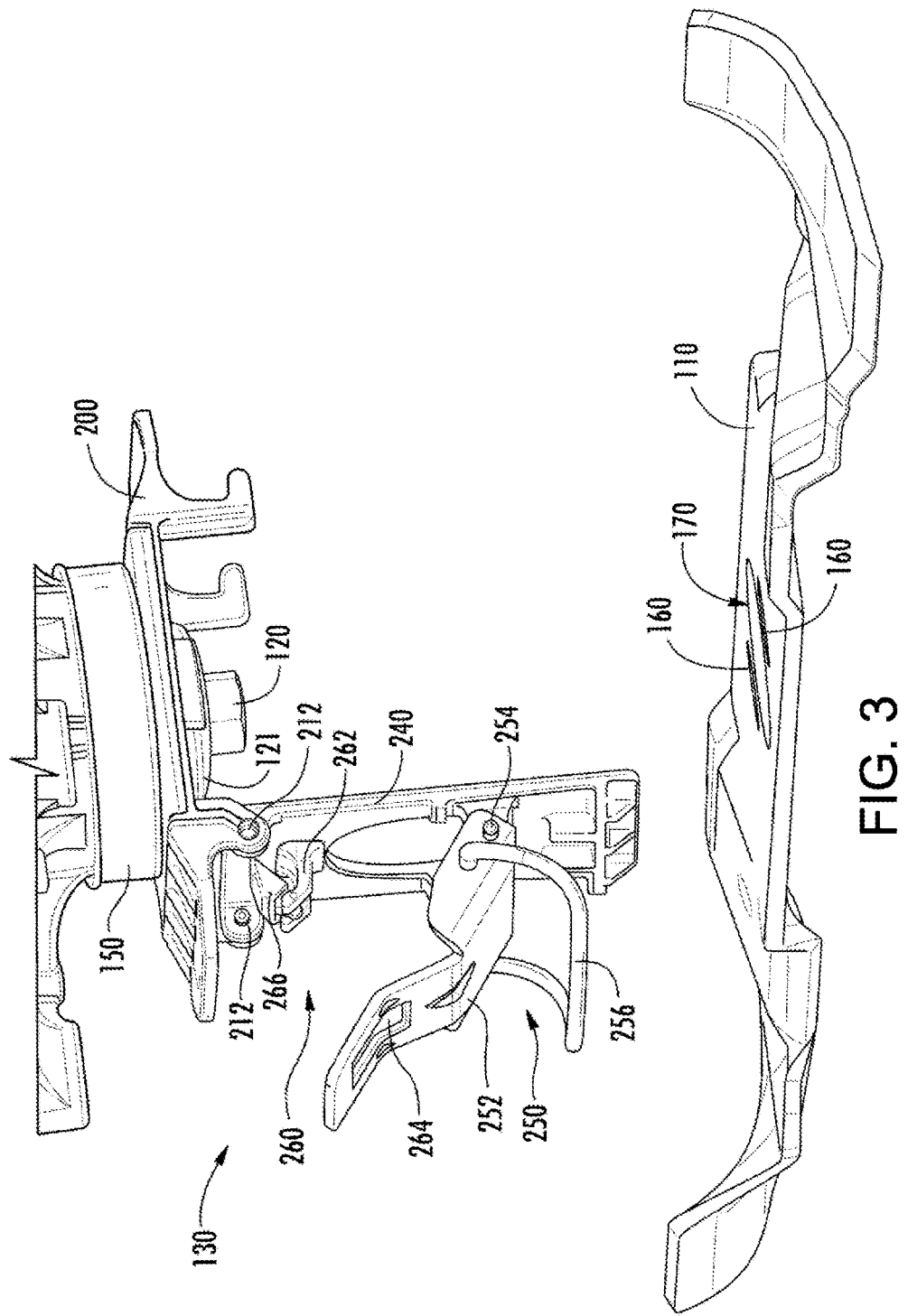
FIG. 3 illustrates an example embodiment of the blade mount showing a spring clamp design where the blade mount is released and the blade is removed according to an example embodiment.

In an example embodiment, the blade mount 130 may take the form of a latch or clasp that may be configured to grasp and hold the blade 110 as described above. FIG. 3 illustrates a perspective view of the blade mount 130 in accordance with such an example. As shown in FIG. 3, the shaft 100 (not shown in FIG. 3) may terminate at a mounting plate 150 proximate to which the blade mount 130 may be attached, or against which the blade mount 130 may be drawn by tightening of bolt 120 to the shaft 100 (with a washer 121 employed in this example). The blade 110 may then be latched or clasped in position by operation of the blade mount 130. As such, the blade mount 130 of an example embodiment may include a spring clamp design such as the one shown in FIG. 3. The clamp design may be structured as an assembly built upon a blade mount base 200 that is physically attached to the bolt 120 and the shaft 100 as described above. The blade mount base 200 of an example embodiment is shown in greater detail in FIG. 4.

Referring now to FIGS. 3 and 4, the blade 110 may include alignment slots 160 and a bolt receiver 170. The bolt receiver 170 may be a cutout portion disposed at a center of the blade 110 (e.g., centered around an intersection of the longitudinal and transverse centerlines of the blade 110) to allow the blade 110 to fit within the blade mount 130 without having interference from the bolt 120. In other words, the bolt receiver 170 may pass from a top face of the blade 110 to a bottom face of the blade 110 at the axis of rotation of the blade 110 to define a gap through which the bolt 120 may pass to enable the blade 110 to first snugly within the blade mount 130 even though the bolt 120 may also protrude into the blade mount 130. In some cases, there may be no force exerted by the bolt 120 on the blade 110 (and in some cases there may be no contact between the bolt 120 and the blade 110) due to the bolt 120 fitting within the bolt receiver 170. The alignment slots 160 and the bolt receiver 170 may be employed for attachment of the blade 110 to the blade mount 130 as described below. In this regard, the alignment slots 160 (or at least one alignment slot) may form a cutout portion of the blade 110 passing from one of the top face or bottom face toward the other of the top face or the bottom face. Moreover, the alignment slots may be disposed spaced apart from an axis of rotation of the blade to receive a corresponding protruding member of the blade mount 130 configured to hold the blade 110 at a portion of the blade 110 other than at the axis of rotation during rotation of the blade 110 responsive to operation of the lawn mower.

The blade mount base 200 that may form a portion of the blade mount 130 to which a clamping device or component (e.g., a spring clamp) is attached could be attached directly to the mounting plate 150 (as shown in FIG. 3), or could be fit within a cover assembly, as described in greater detail below. The blade mount base 200 may be rotatably attached to a clamp 240 via pivot pins 212 that may fit within pivot pin receivers 202 disposed at a portion of the blade mount base 200. The blade mount base 200 may further include an attachment orifice 220 that may be disposed at a center portion of the blade mount base 200. The attachment orifice 220 is shown to have a star pattern in order to receive a correspondingly patterned protrusion that may extend beyond the surface of the mounting plate 150. However, it should be appreciated that any circular or non-circular pattern could be employed on the mounting plate 150 and the attachment orifice 220. The bolt 120 may pass through the attachment orifice 220 to engage the shaft 100 to secure the blade mount base 200 to the mounting plate 150 responsive to tightening of the bolt 120. In some cases, a washer 121 or other intermediate plate shaped component may be disposed between the bolt 120 and the surface of the blade mount base 200 surrounding the attachment orifice 220.

In an alternative embodiment, the attachment orifice 220 may simply be circular in shape, and may not attach to the bolt 120 or the shaft 100. In such an example, the cover assembly itself may hold the blade mount base 200 in place and thus, the cover assembly may include the star shaped pattern shown in FIG. 4 for attachment of the cover assembly to the bolt 120 and shaft 100. Thus, for example, the blade mount base 200 may be secured within the cover assembly and the cover assembly may be secured to the mounting plate 150 and/or the shaft 100 and the bolt 120.

In some embodiments, the pivot pin receivers 202 may be disposed in guide posts 230 that may form one edge of a blade reception channel 232 at a surface of the blade mount base 200. A locking post 234 may be disposed at an opposite side of the blade reception channel 232 relative to each respective one of the guide posts 230. The blade reception channel 232 may include alignment protrusions 236 that may be disposed on opposite sides of the attachment orifice 220. In some embodiments, the alignment protrusions 236 may protrude into the blade reception channel 232 from the blade mount base 200 to project into the alignment slots 160 of the blade 110. To ensure that the blade 110 cannot be installed incorrectly, the alignment protrusions 236 and the alignment slots 160 may be offset to opposite sides relative to a centerline of the longitudinal length of the blade 110. In an example embodiment, the alignment protrusions 236 may have a height that is approximately equal to the thickness of the blade 110 so that the tops of the alignment protrusions are flush with the surface of the blade 110 when the blade 110 is properly positioned in the blade reception channel 232. In some cases, the blade mount base 200 may further include cover snap receivers 238 configured to receive snap fittings associated with the blade mount cover 132 (if employed). In the illustrated embodiment, the blade mount base 200 includes two cover receivers 238, one on each side of the blade reception channel 232 and located far enough from the blade reception channel so that clamp 240 does not interfere with the latch snap fittings on the cover assembly.

In an example embodiment, the clamp 240 may be operably coupled to the blade mount base 200 via the pivot pins 212. The clamp 240 may be rotatable with the pivot pins forming the axis of rotation and may be lockable via engagement of a latch assembly 250 onto the locking posts 234. The latch assembly 250 may include a latch cover 252 that rotates about a roll pin 254 to enable engagement and/or disengagement of a wire element 256 that may be rotatably attached to the latch cover 252 at a portion of the latch cover 252 that is offset from a position at which the roll pin 254 engages the latch cover 252. The wire element 256 may be bent as it extends from the point of engagement of the wire element 256 to the latch cover 252 to a crossbar portion of the wire element 256 that engages the locking posts 234. The bend in the wire element 256 may enable the wire element 256 to provide a spring-like force to pull the latch cover 252 down toward the clamp 240 when the latch cover 252 is rotated about the roll pin 254 while the wire element 256 engages the locking posts 234.

Although not required, the latch cover 252 may be further secured in a clamped position in some embodiments. For example, a locking assembly 260 may be provided to enable the latch cover 252 to be further secured in the clamped position. The locking assembly 260 may include a locking protrusion 262 that may extend through a lock receiver 264 attached to or otherwise forming a portion of the latch cover 252. In some cases, a pin (not shown), such as a cotter pin, R-clip, hairpin or other pin, may extend through the locking protrusion 262 to engage the latch cover 252 responsive to insertion of the locking protrusion 262 through the lock receiver 264. In such an example, the pin may be rotatable (e.g., a quarter turn) to engage the metal forming the lock receiver 264. However, in other embodiments, the locking protrusion 262 may include a movable catch 266 disposed at a distal end thereof. In the example of FIG. 3, the movable catch 266 is rotatable. However, in other examples, the movable catch 266 may slide along a direction substantially parallel to the longitudinal length of the blade 110 when installed. Such a catch is shown in greater detail below, but could be spring loaded to engage the latch cover 242 and the operator may overcome the spring tension to move the movable catch 266 to clear the latch cover 252 and allow the lock receiver 264 to pass beyond the movable catch 266 for opening of the latch assembly 250. After the latch cover 252 clears the movable catch 266, the movable catch 266 may be biased (e.g., by a helical torsion spring or other spring located proximate the axis of a hinge-type connection between the movable catch 266 and the locking protrusion 262) to rotate to a position at which the movable catch 266 prevents movement of the latch cover 252 out of the clamped position. To release the latch cover 252, the operator may simply slide or rotate the movable catch 266 to enable the lock receiver 264 to clear the movable catch 266 and then rotate the latch cover 252 in the opposite direction to move it out of the clamped position. In the illustrated embodiment, the lock receiver 264, movable catch 266, and locking protrusion 262 are located near the end of the latch cover 252 opposite the roll pin 254 so that the operator may be able to rotate or slide the movable catch 266 and lift the latch cover 252 out of the clamped position all with one hand.

As shown in FIG. 4, the blade mount base 200 of some embodiments may also include the blade mount base 200 may further include magnet receptacles 270. The magnet receptacles 270 may include magnets (not shown), such as neodymium magnets or other permanent magnets. These magnets may hold the metal blade 110 to the blade mount base 200 when the blade 110 is installed in the blade reception channel 232. Accordingly, for example, the operator may be enabled to reach under the cutting deck 40 with one hand and operate the latch cover 252 to push the movable catch 266 to allow the latch cover 252 to be rotated to release the wire element 254 from the locking posts 234. After rotating the clamp 240 away from the blade 110, the magnets in the magnet receptacles 270 may hold the blade 110 proximate to the blade mount base 200 to prevent the blade 110 from simply falling out of the blade mount 130. The operator may overcome the magnets and remove the blade 110 to sharpen or replace the blade 110. Meanwhile, when the blade 110 (either sharpened or replaced) is to be put back into the blade mount 130, the magnets may hold the blade 110 in place while the operator manipulates the latch assembly 250 to the clamped position. Thus, in some cases, the operator may be enabled to remove and/or replace the blade 110 with one hand, and without tools.

Figure 6:
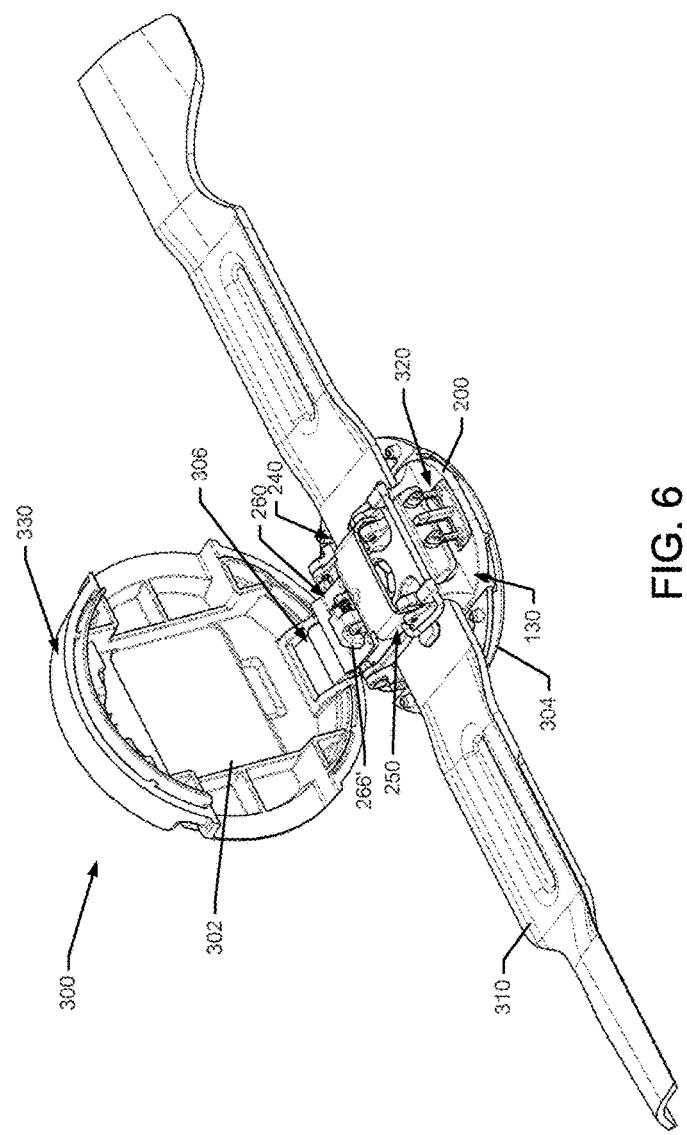
FIG. 6 illustrates a perspective view of the cover assembly in an open position according to an example embodiment.

As mentioned above, in some example embodiments, the blade mount 130 may be protected, housed, or shielded within a cover assembly. The cover assembly may take a number of different forms. However, FIG. 5, which includes FIGS. 5A and 5B, illustrates one such form in accordance with an example embodiment. In this regard, FIG. 5A illustrates a perspective view of a cover assembly 300 in accordance with an example embodiment and FIG. 5B illustrates a side view. The view of the cover assembly 300 of FIG. 5A is the view from below the cutting deck 40. FIG. 5 illustrates the cover assembly 300 in the closed position. Meanwhile, FIG. 6 illustrates the cover assembly 300 in the open position. The cover assembly 300 may include a cover top 302 and a cover base 304 that may selectively (and rotatably) engage each other. As such, when in the closed position (as shown in FIG. 5), the cover top 302 and cover base 304 may be fully engaged with each other at opposite ends thereof. However, when in the opened position, the cover top 302 and cover base 304 may only be engaged at one end or one portion thereof so that the cover top 302 can rotate relative to the cover base 304. Of note, although referred to herein as the cover top 302, the cover top 302 is actually below the cover base 304 when the lawn mower moves over the ground.

As shown in FIG. 5, when closed the cover assembly 300 may substantially hide the blade mount 130 from view while retaining blade 310 during operation of the lawn mower. However, when the cover assembly 300 is opened, it can be appreciated that the blade mount 130 is retained within the cover assembly 300 and shielded from debris that may otherwise impact the blade mount 130. In particular, the blade mount 130 may be securely held within the cover base 304. In an example embodiment, the blade mount 130 may be rotatably secured to the cover base 304 at one end thereof by a pivot assembly 306, and may be secured to the cover base 304 by a snap fitting (e.g., formed by cover latch assembly 320) at an opposing end thereof.

Although the clamp 240, either alone or in combination with the locking assembly 260, may otherwise hold the blade 310 within the blade reception channel 232 of the blade mount 130 regardless of whether impact on the clamp 240 or locking assembly 260 should occur, the cover assembly 300 may nonetheless prevent or inhibit such impacts. Moreover, the cover assembly 300 may act as a further mechanism to prevent inadvertent operation of the clamp 240 and/or the locking assembly 260. In the example of FIG. 6, it should be noted that the movable catch 266' is embodied as a slide latch that slides against a spring bias. The spring biases the movable catch 266' to engage a side portion of an opening formed in the latch cover 252 and lock the latch cover in position. By overcoming the spring force and moving the movable catch 266' along a direction parallel to the direction of extension of the blade 310, the movable catch 266' may disengage the latch cover 252 and enable the latch cover 252 to be moved to unlatch the clamp 240.

As shown in FIGS. 5 and 6, the cover assembly 300 may include the cover latch assembly 320 that is configured to hold the cover top 302 to a cover base 304 when the cover latch assembly 320 is engaged. The cover latch assembly 320 may include protrusions disposed on either the cover top 302 or the cover base 304 to extend through a receiving orifice in the other component and engage corresponding receiving slots that are located proximate to the receiving orifice to hold the protrusions securely in place when the cover assembly 300 is in the closed position. In an example embodiment, the cover assembly 300 may further include a protective side wall 330 that may be disposed to extend around a periphery of the cover assembly 300 at a location proximate to the cover latch assembly 320. The protective side wall 330 may limit access to the cover latch assembly 320 to only a single direction. Thus, debris may not be able to impact the cover latch assembly 320 from the side and cause an inadvertent operation of the cover latch assembly 320.

Figure 7B:
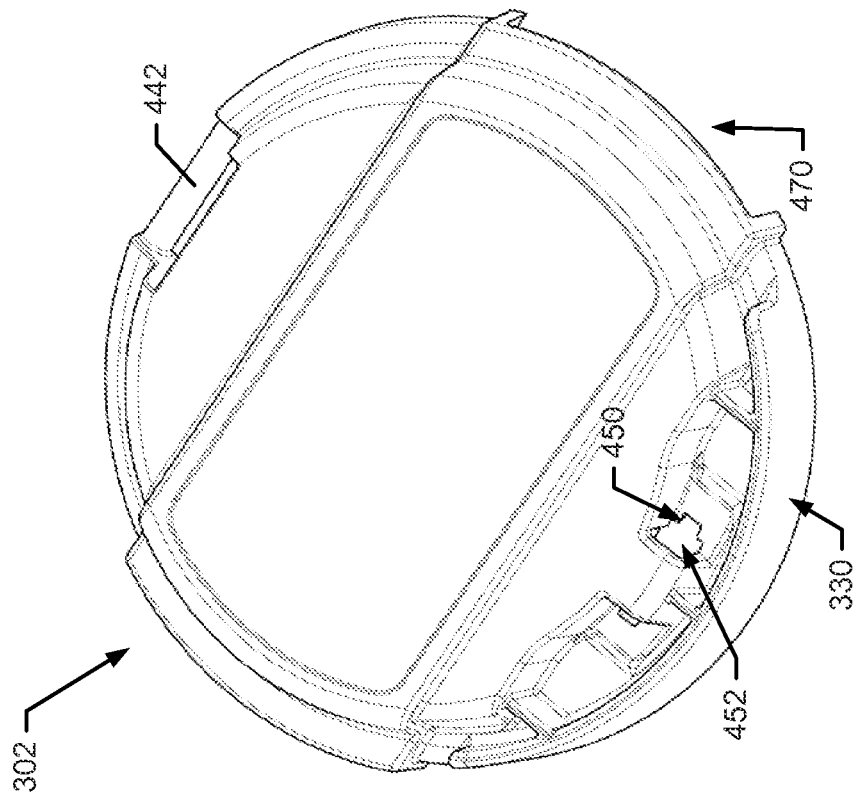
FIG. 7B illustrates a perspective view of the exterior of the cover top according to an example embodiment.
Figure 7A:
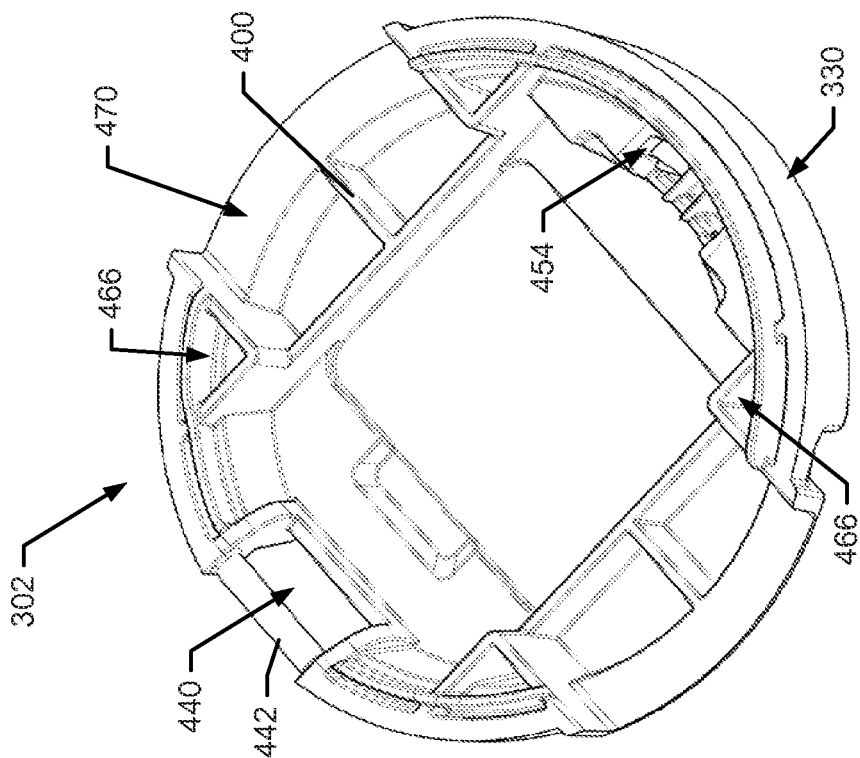
FIG. 7A illustrates a perspective view of the interior of a cover top of the cover assembly according to an example embodiment.

FIG. 7, which includes FIGS. 7A and 7B, illustrates plan views of the cover top 302 according to an example embodiment. FIG. 7A illustrates a perspective view of the interior of the cover top 302 (i.e., the lower portion of the cover assembly 300 when assembled) and FIG. 7B illustrates a perspective view of the exterior of the cover top 302. FIG. 8, which includes FIGS. 8A and 8B, illustrates plan views of the cover base 304 according to an example embodiment. FIG. 8A illustrates a perspective view of the interior of the cover base 304 (i.e., the top portion of the cover assembly 300 when assembled) and FIG. 8B illustrates a perspective view of the exterior of the cover base 304. Referring to FIGS. 7A, 7B, 8A and 8B, the interior views of the cover top 302 and the cover base 304 reveal that several rib structures are provided (e.g., see ribs 400). Meanwhile, the exterior view of the cover base 304 also reveals ribs 402. The ribs 400 and 402 may provide structural strength and may enable the entire cover assembly 300 to be made of molded plastic.

The cover base 304 may define a blade mount reception channel 410. It should be appreciated that the blade mount 130 may fit substantially within the blade mount reception channel 410 and be secured therein. In an example embodiment, the blade mount base 200 may include receiving holes on a portion thereof that faces away from the clamp 240 and the receiving holes may align with alignment protrusions 412 disposed within the blade mount reception channel 410 on only one side of the blade mount reception channel 410. In the example of FIG. 8A, the alignment protrusions 412 may be on the same side of the blade mount reception channel 410 on which the pivot assembly 306 is located. Meanwhile, the cover latch assembly 320 may be provided on the opposite side of the blade mount reception channel 410 and may include a base upon which the cover latch assembly 320 is provided.

The pivot assembly 306 may include a pivot hook 420 disposed at a distal end of a first L-bracket 422. The cover latch assembly 320 may include a snap buckle having at least two protrusions 430, each of which may have a corresponding head 432. The protrusions 430 may be configured to extend away from a second L-bracket 434. The first and second L-brackets 422 and 434 may be disposed to face away from each other at opposing ends of the blade mount reception channel 410.

The pivot hook 420 and the first L-bracket 422 may be enabled to be passed through one of the cover snap receivers 238 of the blade mount 130. Thereafter, the protrusions 430, the heads 432 and the second L-bracket 434 may be enabled to be passed through the other cover snap receiver 238. When the pivot hook 420 and the first L-bracket 422 are passed through the first one of the cover snap receivers 238, the lip (or short arm) of the first L-bracket 422 may substantially engage the blade mount base 200 while the second L-bracket 434 may be bent toward the first L-bracket 422 to enable the lip (or short arm) of the second L-bracket 434 to clear the other cover snap receiver 238. Both cover snap receivers 238 may then be seated below the respective lips of the first and second L-brackets 422 and 434 to seat the blade mount 130 securely within the blade mount reception channel 410 as shown in FIG. 6.

The pivot hook 420 may also be provided through a pivot hook receiver 440 to engage a pivot rod 442 on a side of the cover top 302 that is opposite with respect to the side of the cover top 302 on which the protective side wall 330 is located. When the cover latch assembly 320 is unlatched, the corresponding side of the cover top 302 may fall away from the cover base 304 such that the pivot hook 420 supports the pivot rod 442 as shown in FIG. 6. Thus, the pivot assembly 306 provides a rotatable connection point for supporting the cover top 302 when one hand is used to unlatch the cover latch assembly 320. Of note, it should be appreciated that the image of FIG. 6 provides a view from beneath the cutting deck 40 of the lawn mower.

In some embodiments, the protective side wall 330 may be a portion of one or more sidewalls extending from a peripheral edge portion of the cover top 302 toward the cover base 304, or extending from a peripheral edge portion of the cover base 304 toward the cover top 302. The one or more sidewalls may, together or alone, form a cavity inside which the blade mount 130 may be housed. As such, the one or more sidewalls may extend substantially around a periphery of the blade mount 130. In other words, the plane in which the blade mount 130 lies may intersect the one or more sidewalls.

The cover top 302 may further include receiving slots 450 that are disposed proximate to receiving orifices 452 disposed on an opposite side of the cover top 302 as the side on which the pivot rod 442 is located. The receiving slots 450 and the receiving orifices 452 may form the receiving end of the snap buckle that is formed into the cover latch assembly 320 in combination with the protrusions 430 and the heads 432. The receiving orifices 452 may be large enough to enable the heads 432 to fit therethrough. However, the receiving slots 450 may be large enough to receive the protrusions 430, but not large enough to let the heads 432 pass therethrough. In an example embodiment, ramps 454 may be provided at a portion of the cover top 302 to engage the heads 432 as the cover top 302 is pivoted about the pivot assembly 306 to push the cover top 302 toward full seating with the cover base 304 in the closed position. The protrusions 430 may be substantially rigid, but flexible, so that the heads 432 may be displaced inwardly toward each other as the heads 432 ride up the ramps 454. This inward displacement may build up an outwardly oriented biasing force. When the heads 432 ride up the ramps 454 to the point where the heads 432 pass through the receiving orifices 452, the heads 432 may snap outwardly away from each other such that the heads sit proximate to the receiving slots 450 and the protrusions 430 are seated therein responsive to release of the biasing force. As such, the cover latch assembly 320 may be latched when the protrusions 430 are within the receiving slots 450 and the heads 432 are seated thereon.

In an example embodiment, the only way to unlatch the cover latch assembly 320 may be to use fingers (or a tool) to pinch inwardly on the heads 432 to push them back through the receiving orifices 452. As such, the heads 432 form squeeze tabs that are generally squeezed inwardly to enable the heads 432 to clear the receiving slots 450 and pass through the receiving orifices 452 for unlatching. By providing the protective side wall 330 to extend around a periphery of the cover top 302 at a location proximate to the cover latch assembly 320, the heads 432 may only be engaged from a single direction (e.g., a direction parallel with the direction of extension of the shaft) to thereby reduce any chance that debris could impact the cover latch assembly 320 from the side and cause an inadvertent operation of the cover latch assembly 320.

In some embodiments, the cover base 304 may include a receiving opening 460 that may be coaxial with the attachment orifice 220 of the blade mount base 200. Sidewalls 462 may be formed on either side of the blade mount reception channel 410 to define the blade mount reception channel 410. In some cases, one or more alignment pegs 464 may protrude from a portion of the sidewalls 462 to fit within gaps 466 disposed at corresponding locations on the cover top 302. When the cover latch assembly 320 is latched, the alignment pegs 464 may be received in the gaps 466 to facilitate proper alignment of the cover top 302 with the cover base 304.

As can be appreciated from FIGS. 7A and 7B, the cover top 302 may further define a blade channel 470, and the blade channel 470 may extend along a direction that is substantially perpendicular to the direction of extension of the blade mount reception channel 410 when the cover top 302 and the cover base 304 are mated with each other.

The cover latch assembly 320 of FIGS. 5-8 is merely one example of a latching mechanism that could be employed in some example embodiments. Other example latching mechanisms could be employed in other contexts. The alternative latching mechanisms could be operable with or without the use of tools in various embodiments. For example, FIGS. 9-11 illustrate an example of an alternative latching mechanism design that is operable without the use of tools. Of note, with the exception of having a different latching mechanism, the cover base and the cover top of this example embodiment may be structured the same as (or similar to) the cover base 304 and the cover top 302 described above in connection with the example of FIGS. 5-8.

FIG. 9 is a perspective view of the cover assembly 300' of an example embodiment employing one alternative latching mechanism. FIG. 10, which includes FIGS. 10A, 10B and 10C, illustrates the cover top 302' and cover base 304' of this example embodiment in isolation. In particular, FIG. 10A illustrates a perspective view of the exterior of the cover top 302', FIG. 10B illustrates a top view of an interior of the cover top 302' and FIG. 10C illustrates an interior, perspective view of the cover base 304' in accordance with an example embodiment. FIG. 11, which includes FIGS. 11A and 11B, shows the locked and unlocked states of the latch assembly of this example embodiment. In particular, FIG. 11A illustrates the locked position or state and FIG. 11B illustrates the unlocked position or state.

Referring now to FIGS. 9-11, the cover latch assembly 320' of this example embodiment employs a rotatable cap 500 that is disposed within a circular shaped recess formed within the cover top 302'. The rotatable cap 500 may be held within the recess by cap holding arms 510 that may be disposed at intervals around the periphery of the rotatable cap 500. In an example embodiment, the cap holding arms 510 may have a ramped face 512 that slopes toward the recess to enable the rotatable cap 500 to slide down the ramped face 512 and slightly displace the cap holding arms 510 outward until the rotatable cap 500 clears the ramped face 512 and passes into the recess to be held therein by the cap holding arms 510. As such, the rotatable cap 500 may be snap fitted within the recess. In an example embodiment, features within the recess may be provided to fit with the rotatable cap 500 and permit rotation of the rotatable cap 500 over only a limited range within the recess (e.g., a quarter turn, eighth of a turn, etc.). The rotatable cap 500 may therefore be turned between locked and unlocked positions.

In an example embodiment, the recess may further include a locking slot 520 disposed substantially at a center portion of the recess. The locking slot 520, which is visible in FIGS. 9 and 10A, may be shaped to receive a locking head 530 disposed at the end of a locking post 540 that may extend from an L-bracket that locks the blade mount 130 into place as described above. The locking post 540 could have any shape including, for example, a cylindrical shape. However, in an example embodiment, the locking head 530 may have a different shape such that at least one (and in this case two) protrusions extend substantially perpendicularly away from the longitudinal axis of the locking post 540. In this example, the protrusions extend away from each other in opposite directions to form a key member that is shaped to fit within the locking slot 520 when the cover top 302' is pivoted to engage the cover base 304' in the closed position.

The rotatable cap 500 may include a slot 550 that is also shaped to be capable of receiving the locking head 530 and allowing the locking head 530 to pass therethrough when the cover top 302' is closed onto the cover base 304'. The slot 550 and the locking slot 520 may have similar shapes. The rotatable cap 500 may also include a tab 560 that may be configured to extend away from a cap face 562 that may form a surface of the rotatable cap 500 that is engaged by the cap holding arms 510 when the rotatable cap 500 is installed into the recess. The slot 550 may pass through the cap face 562 and, in some embodiments, may be substantially aligned with the tab 560. As such, when viewed from directly above, it may not be possible (or may be difficult) to see the slot 550 beneath the tab 560.

When the rotatable cap 500 is rotated to the unlock position shown in FIG. 11B, the slot 550 may be aligned with the locking slot 520. Accordingly, if the cover top 302' is rotated to couple with the cover base 304', the locking head 530 and the locking post 540 may be enabled to pass through the slot 550 and the locking slot 520. If the cover top 302' is fully engaged with the cover base 304', the locking head 530 may extend through the locking slot 520 and the slot 550 such that the protrusions of the locking head 530 pass beyond the cap face 562. Thereafter, if the rotatable cap 500 is turned (e.g., an eighth of a turn) as shown in FIG. 11A to the locked position, the cap face 562 is rotated so that the slot 550 and the locking slot 520 are no longer in alignment. The protrusions of the locking head 530 may then be in contact with the cap face 562 to lock the cover top 302' in contact with the cover base 304'. Unlocking may be accomplished by turning the tab 560 so that the slot 550 and the locking slot 520 are again in alignment with each other to permit the locking head 530 to be withdrawn therefrom as the cover top 302' is rotated to the open position. According to this example embodiment, again, locking and unlocking of the cover assembly 300' may be accomplished without the use of tools.

In some embodiments, a torsion spring may be provided within the recess to bias the rotatable cap 500 toward the locked position. Thus, the rotatable cap may generally remain locked, but the operator may exert a force to overcome the spring force and align the locking slot 520 with the slot 550 so that the locking head 530 can be withdrawn from the locking slot 520 and the slot 550 to pivot the cover top 302' to the open position.

The example embodiment of FIG. 12 is provided to illustrate one embodiment in which tools may be employed to open a cover assembly 300''. FIG. 12, which includes FIGS. 12A and 12B, illustrates perspective views of the cover top 302'' (FIG. 12A) and cover base 304'' (FIG. 12B) of another alternative embodiment. In the example of FIG. 12, the L-bracket on the cover base 304'' may be provided with a threaded receiver 600 that may be aligned with a receiver disposed in the cover top 302''. The receiver in the cover top 302'' may be provided with a threaded fastener 610 (e.g., a screw) that may engage the threaded receiver 600 to lock the cover top 302'' to the cover base 304'' when tightened. Although FIG. 12 illustrates an example in which a tool (e.g., a screw driver) may be required to tighten and loosen the threaded fastener 610, the threaded fastener 610 of some alternative embodiments may be provided to include one or more tabs or other graspable features (e.g., a knurled head) that can be engaged by the fingers of the operator to turn the threaded fastener 610 by hand, and without tools. In some embodiments, the threaded fastener 610 may be configured to be turnable by hand, but in case sufficient grip to cause turning cannot be achieved for any reason, a slot may be provided in the head of the threaded fastener to allow a tool (e.g., a screwdriver) to be used to rotate the threaded fastener 610.

Thus, example embodiments provide various different ways that a quick-change blade system may be housed within a cover assembly to provide operators with a mechanism by which blades may be removed or replaced relatively easily and quickly, while still shielding the assembly that holds them during operation. Moreover, some example embodiments may enable blade removal and/or replacement, along with the opening of the cover assembly to provide access thereto, to be performed without tools and, in at least some cases with one hand. Some embodiments may enable blade change/replacement to be performed without tipping the lawn mower, elevating the lawn mower or removing the cutting deck. Thus, operators may enjoy a simpler blade change/removal procedure and may be encouraged to perform blade sharpening or replacement on a more frequent basis to keep lawn care performance and quality at a high level.

In an example embodiment, a lawn care device is provided. The lawn care device may include a cutting deck housing at least one blade, a rotatable shaft, and a blade mount operably coupled to the rotatable shaft. The blade mount may include a clasp to secure the at least one blade within an engagement slot of the blade mount. The cover assembly may form a cavity with at least one sidewall extending substantially around a periphery of the blade mount. In some cases, the cover assembly may further include a cover base and a cover top that form the cavity and receive the blade mount therein. The cover top may be configured to pivot relative to the cover base between an open position and a closed position and, in the closed position, engage the cover base via a latch assembly.

The lawn care device of some embodiments may include additional features that may be optionally added. For example, in some embodiments, (1) the blade mount may be snap fitted into the cover base. Additionally or alternatively, (2) the cover top and cover base may combine to house the blade mount entirely therein. Additionally or alternatively, (3) the latch assembly may be operable without tools. Additionally or alternatively, (4) the latch assembly may include a snap buckle. Additionally or alternatively, (5) the latch assembly may be disposed proximate to a periphery of the cover assembly at an opposite side of the cover assembly relative to a pivot assembly about which the cover top pivots relative to the cover base. Additionally or alternatively, (6) the pivot assembly may include a first bracket supporting a pivot hook. The latch assembly may be supported by a second bracket, and the first and second brackets may combine to hold the blade mount within the cover base. Additionally or alternatively, (7) a protective side wall extends around the periphery of the cover assembly proximate to the latch assembly to shield the latch assembly.

In some embodiments, any or all of (1) to (7) may be employed, and the latch assembly may include a threaded fastener engaging the cover top to the cover base. In some embodiments, any or all of (1) to (7) may be employed, and the latch assembly comprises a rotatable cap that selectively engages or disengages a locking head that extends from the cover base through a slot in the rotatable cap. In some embodiments, any or all of (1) to (7) may be employed, and the latch assembly may include a rotatable cap that snaps into a recess in the cover top and rotates a slot in the rotatable cap in or out of alignment with a receiving slot disposed in the cover top to selectively engage or disengage a locking head that extends from the cover base. In some embodiments, any or all of (1) to (7) may be employed, and the latch assembly may include a locking head disposed to extend from a bracket that at least in part secures the blade mount to the cover base through the cover top to be selectively engaged by a rotatable cap. In some embodiments, any or all of (1) to (7) may be employed, and the latch assembly may include first protrusion having a first head and a second protrusion having a second head. The first and second protrusions may extend substantially parallel to each other such that, responsive to closing the top cover relative to the cover base, the first and second heads engage respective ramp portions exerting a biasing force on the first and second heads until the heads pass through a receiving orifice where the biasing force is released as the first and second heads engage respective receiving slots. In some embodiments, any or all of (1) to (7) may be employed, and the latch assembly may include first protrusion having a first head and a second protrusion having a second head. The first and second protrusions may extend substantially parallel to each other away from the cover base to engage respective receiving slots on the cover top to lock the cover assembly in the closed position. The first and second heads may be pressed toward each other to unlatch the latch assembly. In some embodiments, any or all of (1) to (7) may be employed, and the latch assembly may include a first protrusion having a first head and a second protrusion having a second head. The first and second protrusions may extend substantially parallel to each other away from a bracket that at least in part secures the blade mount to the cover base to engage the cover top to lock the cover assembly in the closed position.

Although some example embodiments have been described above in the context of employment within the cutting deck of a riding lawn mower, it should be appreciated that example embodiments may also be practiced in other contexts as well. For example, numerous other types of outdoor power equipment that employ blades could benefit from employment of quick-change blade technology as described herein. Thus, example embodiments may be practiced on either riding or walk behind lawn mower models as well as in connection with trimmers, edgers, circular saws, chain saw bars, agricultural equipment, and/or the like. Still other example embodiments may be practiced on other devices as well. For example, some embodiments of the quick-change mounting systems may be used to attach fan blades to a fan and/or other rotary elements to a rotating spindle. Moreover, as indicated above, some models may be produced from the factory with quick-change fittings and corresponding cover assemblies installed. However, other models may be retrofitted by installing a blade mount in a similar fashion to that which was previously used to install the blades themselves. Once the blade mount is in place, quick-change blades may be employed even by older models, and the cover assembly described herein may be employed.

Example embodiments may not only provide for ease of access while protecting the blade mount, but the cover assembly described herein may be sufficient to pass various structural certification tests such as the ANSI B71.1 Structural Integrity Test and the ANSI B71.1 22.3.7 and 22.3.8 tests.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be That which is claimed:

1. A lawn care device comprising:
   a cutting deck housing at least one blade;
   a rotatable shaft;
   a blade mount operably coupled to the rotatable shaft, the blade mount comprising a clasp to secure the at least one blade within an engagement slot of the blade mount; and
   a cover assembly forming a cavity with at least one sidewall extending substantially around a periphery of the blade mount,
   wherein the cover assembly comprises a cover base and a cover top that form the cavity and receive the blade mount therein,
   wherein the cover top is configured to pivot relative to the cover base between an open position and a closed position and, in the closed position, engage the cover base via a latch assembly,
   wherein the latch assembly is disposed proximate to a periphery of the cover assembly at an opposite side of the cover assembly relative to a pivot assembly about which the cover top pivots relative to the cover base, and
   wherein the pivot assembly comprises a first bracket supporting a pivot hook, wherein the latch assembly is supported by a second bracket, and wherein the first and second brackets combine to hold the blade mount within the cover base.

2. The lawn care device of claim 1, wherein the cover top and cover base combine to house the blade mount entirely therein.

3. The lawn care device of claim 1, wherein the latch assembly is operable without tools.

4. The lawn care device of claim 1, wherein the latch assembly comprises a snap buckle.

5. The lawn care device of claim 1, wherein a protective side wall extends around the periphery of the cover assembly proximate to the latch assembly to shield the latch assembly.

6. The lawn care device of claim 1, wherein the blade mount is snap fitted into the cover base.

7. The lawn care device of claim 1, wherein the latch assembly comprises a threaded fastener engaging the cover top to the cover base.

8. The lawn care device of claim 1, wherein the latch assembly comprises a rotatable cap that selectively engages or disengages a locking head that extends from the cover base through a slot in the rotatable cap.

9. The lawn care device of claim 1, wherein the latch assembly comprises a rotatable cap that snaps into a recess in the cover top and rotates a slot in the rotatable cap in or out of alignment with a receiving slot disposed in the cover top to selectively engage or disengage a locking head that extends from the cover base.

10. The lawn care device of claim 1, wherein the latch assembly comprises a locking head disposed to extend from the second s-bracket that at least in part secures the blade mount to the cover base through the cover top to be selectively engaged by a rotatable cap.

11. The lawn care device of claim 1, wherein the latch assembly comprises a first protrusion comprising a first head and a second protrusion comprising a second head, the first and second protrusions extending substantially parallel to each other such that, responsive to closing the top cover relative to the cover base, the first and second heads engage respective ramp portions exerting a biasing force on the first and second heads until the heads pass through a receiving orifice where the biasing force is released as the first and second heads engage respective receiving slots.

12. The lawn care device of claim 1, wherein the latch assembly comprises a first protrusion comprising a first head and a second protrusion comprising having a second head, the first and second protrusions extending substantially parallel to each other away from the cover base to engage respective receiving slots on the cover top to lock the cover assembly in the closed position, and wherein the first and second heads are pressed toward each other to unlatch the latch assembly.

13. The lawn care device of claim 1, wherein the latch assembly comprises a first protrusion comprising a first head and a second protrusion comprising a second head, the first and second protrusions extending substantially parallel to each other away from a bracket that at least in part secures the blade mount to the cover base to engage the cover top to lock the cover assembly in the closed position.

14. A lawn care device comprising:
   a cutting deck housing at least one blade;
   a rotatable shaft;
   a blade mount operably coupled to the rotatable shaft, the blade mount comprising a clasp to secure the at least one blade within an engagement slot of the blade mount; and
   a cover assembly comprising a cover top and a cover base, the cover assembly forming a cavity with at least one sidewall extending substantially around a periphery of the blade mount,
   wherein the cover top defines a blade channel comprising a longitudinal length that is substantially perpendicular to a longitudinal length of a blade mount reception channel of the cover base, in which the blade mount is retained.

15. A cover assembly for housing a blade mount configured to couple a blade to a rotatable shaft, the blade mount comprising a clasp to secure the at least one blade within an engagement slot of the blade mount, the cover assembly comprising a sidewall extending around a periphery of the cover assembly to form a cavity in which the blade mount is provided, the sidewall extending substantially around a periphery of the blade mount,
   wherein the cover assembly further comprises a cover base proximate to the shaft, and a cover top,
   wherein the cover top is configured to pivot relative to the cover base between an open position and a closed position and, in the closed position, engage the cover base via a latch assembly,
   wherein the latch assembly is disposed proximate to a periphery of the cover assembly at an opposite side of the cover assembly relative to a pivot assembly about which the cover top pivots relative to the cover base, and
   wherein the pivot assembly comprises a first bracket supporting a pivot hook, wherein the latch assembly is supported by a second bracket, and wherein the first and second brackets combine to hold the blade mount within the cover base.

16. The cover assembly of claim 15, wherein the latch assembly comprises a rotatable cap that selectively engages or disengages a locking head that extends from the cover base through a slot in the rotatable cap.

17. The cover assembly of claim 15, wherein the latch assembly comprises a rotatable cap that snaps into a recess in the cover top and rotates a slot in the rotatable cap in or out of alignment with a receiving slot disposed in the cover top to selectively engage or disengage a locking head that extends from the cover base.

18. The cover assembly of claim 15, wherein the latch assembly comprises a locking head disposed to extend from a bracket that at least in part secures the blade mount to the cover base through the cover top to be selectively engaged by a rotatable cap.

19. The cover assembly of claim 15, wherein the latch assembly comprises a first protrusion comprising a first head and a second protrusion comprising a second head, the first and second protrusions extending substantially parallel to each other away from a bracket that at least in part secures the blade mount to the cover base to engage the cover top to lock the cover assembly in the closed position.

20. The cover assembly of claim 15, wherein the cover top defines a blade channel comprising a longitudinal length that is substantially perpendicular to a longitudinal length of a blade mount reception channel of the cover base, in which the blade mount is retained.

* * * * *

UNITED STATES PATENT AND TRADEMARK OFFICE
CERTIFICATE OF CORRECTION

PATENT NO. : 9,723,782 B2
APPLICATION NO. : 14/908238
DATED : August 8, 2017
INVENTOR(S) : Chris Roth et al.

It is certified that error appears in the above-identified patent and that said Letters Patent is hereby corrected as shown below:

In the Claims

Column 17, Claim 10, Line 3: "the second s-bracket that at least in part secures the blade" should read -- the second bracket that at least in part secures the blade --

Column 18, Claim 12, Line 3: "and a second protrusion comprising having a second head," should read -- and a second protrusion comprising a second head, --

Signed and Sealed this
Tenth Day of July, 2018

Andrei Iancu
*Director of the United States Patent and Trademark Office*